(12) United States Patent
Malshe et al.

(10) Patent No.: US 9,885,116 B2
(45) Date of Patent: Feb. 6, 2018

(54) PROCESS OF MAKING NON-METALLIC NANO/MICRO PARTICLES COATED WITH METAL, AND APPLICATIONS THEREOF

(71) Applicant: NanoMech, Inc., Fayetteville, AR (US)

(72) Inventors: Vinod Chintamani Malshe, Mumbai (IN); Ajay Prabhakar Malshe, Springdale, AR (US)

( * ) Notice: Subject to any disclaimer, the term of this patent is extended or adjusted under 35 U.S.C. 154(b) by 0 days.

(21) Appl. No.: 14/577,336

(22) Filed: Dec. 19, 2014

(65) Prior Publication Data

US 2015/0104572 A1  Apr. 16, 2015

Related U.S. Application Data

(62) Division of application No. 12/227,716, filed as application No. PCT/US2007/011998 on May 21, 2007, now abandoned.

(30) Foreign Application Priority Data

May 22, 2006 (IN) .......................... 772/MUM/2006

(51) Int. Cl.
*C23C 18/08* (2006.01)
*C23C 18/44* (2006.01)
(Continued)

(52) U.S. Cl.
CPC .......... *C23C 18/1658* (2013.01); *B22F 1/025* (2013.01); *C08K 9/02* (2013.01); *C23C 18/1635* (2013.01); *C23C 18/1639* (2013.01); *C23C 18/1662* (2013.01); *C23C 18/1676* (2013.01); *C23C 18/31* (2013.01); *C23C 18/34* (2013.01); *C23C 18/40* (2013.01); *C23C 18/44* (2013.01); *B22F 2999/00* (2013.01); *C08K 2201/011* (2013.01); *Y10T 428/249921* (2015.04); *Y10T 428/2991* (2015.01); *Y10T 428/2993* (2015.01); *Y10T 428/2998* (2015.01)

(58) Field of Classification Search
CPC .......... C23C 8/40; C23C 20/02; C23C 22/05; C23C 30/00; C23C 18/08; C23C 18/16; C23C 18/34; C23C 18/40; C23C 18/44; C23C 18/52
USPC .................... 427/215, 217, 314, 372.2, 383.3
See application file for complete search history.

(56) References Cited

U.S. PATENT DOCUMENTS 3,437,507 A * 4/1969 Jensen .................... C23C 18/24
106/1.11
4,353,741 A * 10/1982 Capuano ................. C22B 11/04
427/217

(Continued)

*Primary Examiner* — Holly Le

(57) ABSTRACT

The present invention provides a simple and economical process for preparation of metal-coated non-metallic nano/micro particles. The nano/micro particles are composed of a core and metallic coat over the core using silver or other transition/noble metals. The core of the non-metallic nano/micro particles are selected from inorganic material such as silica, calcium carbonate, barium sulfate, or emulsion grade polyvinyl chloride and other polymers prepared by emulsion process including porous polymers. The metal coating is selected from the transition/noble metals such as copper, nickel, silver, palladium, platinum, osmium, ruthenium, rhodium, and such other metals and their combinations that are easily reducible to elemental metal.

16 Claims, 2 Drawing Sheets

(51) Int. Cl.
*C23C 18/16* (2006.01)
*B22F 1/02* (2006.01)
*C23C 18/31* (2006.01)
*C08K 9/02* (2006.01)
*C23C 18/34* (2006.01)
*C23C 18/40* (2006.01)

(56) References Cited

U.S. PATENT DOCUMENTS

| | | | | |
|---|---|---|---|---|
| 5,082,826 | A * | 1/1992 | Ferrando | B22F 1/025 252/514 |
| 5,134,039 | A * | 7/1992 | Alexander | C23C 18/1635 419/19 |
| 5,178,909 | A * | 1/1993 | Hayashi | 427/216 |
| 5,885,635 | A * | 3/1999 | Spring et al. | 426/120 |
| 5,945,158 | A * | 8/1999 | Djokic et al. | 427/216 |
| 6,586,047 | B2 * | 7/2003 | Durkin et al. | 427/217 |
| 2004/0265590 | A1 * | 12/2004 | Schichtel | 428/403 |
| 2010/0047546 | A1 * | 2/2010 | Malshe et al. | 428/221 |

* cited by examiner

PROCESS OF MAKING NON-METALLIC NANO/MICRO PARTICLES COATED WITH METAL, AND APPLICATIONS THEREOF

REFERENCE TO RELATED APPLICATIONS

This patent application is a divisional of U.S. patent application Ser. No. 12/227,716, entitled "Non-Metallic Nano/Micro Particles Coated with Metal, Process and Applications Thereof," which is a national-phase of international patent application Ser. No. PCT/US2007/011998, entitled "Non-Metallic Nano/Micro Particles Coated with Metal, Process and Applications Thereof," filed May 21, 2007, which claims priority to Indian provisional patent application Ser. No. 772/MUM/2006, filed May 22, 2006. Each of these applications are incorporated herein by reference.

TECHNICAL FIELD OF THE INVENTION

This invention generally relates to non-metallic nano/micro particles coated with metal, particularly to nano/micro particles of silica, barium sulfate, calcium carbonate, solid polymer particles or high-area porous polymeric nano/micro particles coated with silver or other transition/noble metals. The invention also relates to a simple and economical process for preparation and application of the same. This invention also relates to a unique process mechanism enabling applications for a sustainable environment.

BACKGROUND

Micro- and nanotechnologies are at the centre of numerous investigations and huge investments, particularly in the areas of information technologies, food and health care. Coupling the skills in mineral synthesis, organic synthesis, physical-chemistry of complex media, and physics of materials has been the key for the success of these developments. Nano and micro particles in particular have a wide range of industrial applications such as in healthcare, medical, and photographic emulsions. In other applications, nano/micro particles have been used as nucleation centers, which may be used to form larger particles with specific constructions.

Silver has long been considered a powerful and natural antibiotic and antibacterial. The combination of silver and nano/micro particles is extremely attractive in many areas. The extremely small size of silver nano and micro particles means they exhibit high surface to volume ratios, and thus enhanced surface related properties such as catalysis when compared with bulk silver. This allows them to easily and aggressively interact with the environment, including microorganisms as well as other environmental agents, thus increasing their antibacterial efficiency.

In addition to having an antibacterial effect, silver has antifungal and deodorizing effects that have been recently exploited commercially. A study from the University of Texas and Mexico University was recently published in the journal Nanotechnology that showed silver nanoparticles are able to kill HIV-1. This study looked at the effect of silver nanoparticles in the range of 1-100 nm on Gram-negative bacteria using high angle annular dark field (HAADF) scanning transmission electron microscopy (STEM). Their results indicated that the bactericidal properties of the nanoparticles were size dependent, since the only nanoparticles that presented a direct interaction with the bacteria preferentially have a diameter of ~1-10 nm. The authors have postulated that the nanoparticles could kill other viruses in addition to HIV-1. The benefits of silver nanoparticles continue to be explored. Researchers are optimistic that nanoengineered silver may be the solution to controlling many types of viruses. Silver may now come under consideration as an alternative to drugs when it comes to fighting previously untreatable viruses such as the Tamiflu-resistant Avian flu.

Worldwide there is a very significant economic loss in discarded foods due to spoilage. For example, one source reports that the food industry annually discards $35 billion worth of spoiled goods. Fifty-six percent of all supermarket store shrink is reported to come from perishables, according to a 2003 survey. Currently the trend in the food growing and retail industry is to engineer the sustainable supply chain. This entails extending and measuring the usable life of fruits and other produce as well the process of saving energy required for continuously cooling fruits and other produce to preserve the freshness by keeping the bacterial count low. Synergistically, industry trends are towards an increase in healthier lifestyles by consuming more fresh-cut produce with a demand for eco-friendly sustainable packaging that can sense, monitor, communicate and extend the useable life of foods. In particular, current methods used for extending the useable life of these products include pesticides, fertilizers and picking the produce before it is ripe. Other methods include various packaging alternatives, which include control of respiration and the depleting of area ethylene.

Various processes to produce nano/micro particles are known. For example, U.S. Pat. No. 7,128,816 issued to Denes, et al. discloses a process for producing colloidal dispersions of nanoparticles of electrically conducting materials. The colloidal dispersions are produced in a dense media plasma reactor that has at least one static electrode and at least one rotating electrode. Minute particles are sputtered off of the electrically conducting material from which the electrodes are made.

Indian patent 192012 describes an emulsion process for preparing porous polymer nanoparticles.

International patent application publication WO9106036 discloses methods of coating a nanoparticle with one or more layers of various types of materials. It also discloses a method for preparation of metal-coated nanoparticles, in which the metal halide nanoparticles are prepared and exposed to ultraviolet light to change the metal halide to metal to form metal coatings over individual nanoparticles. In another process variant, silver-coated particles are prepared by a process by providing silver ion source and halide ion source to produce silver halide coated nanoparticles and subsequently exposing the silver halide nanoparticles to ultraviolet light in EDTA to reduce the silver halide coating to silver-coated nanoparticles. In a further process variant, silver halide coated particles and an electron scavenger are contained in an anaerobic liquid carrier and uniformly distributed therein, such that exposing the liquid carrier to light of sufficient strength and for a sufficient time reduces the silver halide coating to metallic silver.

In Cong et al., "Hollow Cu—NP Spheres Made from Electroless Cu Deposition with Colloidal Particles as Templates," a process is described for producing hollow copper spheres in the nanoparticle range using $SiO_2$ and PSMA nanoparticles as a template core. The core is removed to yield a hollow metal nanoparticle. Wall thickness on the $SiO_2$-produced particles was measured to be about 30 nm, and wall thickness on the PSMA-produced particles was measured to be about 55 nm, although the thinner-walled $SiO_2$-produced particles were less likely to break during core removal.

International patent application publication WO9106036 discloses methods of coating a nanoparticle with one or more layers of various types of materials. It also discloses a method for preparation of metal-coated nanoparticles, in which the metal halide nanoparticles are prepared and exposed to ultraviolet light to change the metal halide to metal to form metal coatings over individual nanoparticles. In another process variant, silver-coated particles are prepared by a process by providing silver ion source and halide ion source to produce silver halide coated nanoparticles and subsequently exposing the silver halide nanoparticles to ultraviolet light in EDTA to reduce the silver halide coating to silver-coated nanoparticles. In a further process variant, silver halide coated particles and an electron scavenger are contained in an anaerobic liquid carrier and uniformly distributed therein, such that exposing the liquid carrier to light of sufficient strength and for a sufficient time reduces the silver halide coating to metallic silver.

All of the processes discussed in the above application for preparing silver-coated nanoparticles are tedious and lengthy. They are also limited in that they could only produce coated nanoparticles having a coat of a certain size or greater. Silver bromide is insoluble in water, the medium that is being used in these processes for the deposition from a silver nitrate or a soluble silver salt. It requires a very high gelatin concentration to hold the particle size to the nanoparticle range, which is a very well known method of producing high-speed photographic films. If the gelatin concentration is low, and the silver concentration is high, say about 1%, then the bromide precipitates in a very coarse particle size. Thus if one were depositing a silver film, the result would be the deposit of silver particles of almost matching dimensions, and therefore a mixture of nanoparticles and large particles.

The processes discussed in the above applications for preparing coated silver nano/micro particles are tedious and lengthy. It would be desirable to provide an efficient, less tedious method of coating the nano/micro particles that also increases the effective surface area of the silver several-fold, allowing reduction of total used silver and production in a shorter amount of time.

Disclosure of the Invention

The present invention provides a simple and economical process for preparation of metal-coated non-metallic nano/micro particles. As used herein, the term "nanoparticle" means any particle or structure having a diameter or dimension of about 100 nm or less. "Microparticle" means a tiny particle that is larger than a nanoparticle, and the term "nano/micro particle" includes particles of both size ranges. These terms as used herein include particles of all shapes, including but not limited to spheres, cylinders, and rods. The particles of the present invention comprise a core and metallic coat over the core using silver or other transition/noble metals. The core of the non-metallic particles are selected from material such as, but not limited to, silica, calcium carbonate, barium sulfate, or emulsion grade polyvinyl chloride and other polymers prepared by an emulsion process including porous polymers.

The present invention describes non-metallic nano/micro particles coated with transition/noble metals such as, but not limited to, copper, nickel, silver, palladium, platinum, osmium, ruthenium, rhodium and such other metals which are easily reducible to elemental metal. Advantageously, the nano/micro particles of the present invention may be prepared with reduced manufacturing cost, and with increased industrial applicability.

In accordance with the present invention, nano/micro particles comprise a non-metallic core and a layer of elemental metal disposed over the core. These coated nano/micro particles are equivalent to hollow nano/micro particles of metal, where all the metal and some part of the core will participate in the desired mechanism and be used up in the life cycle of the product.

The particles coated with silver of a preferred embodiment of the present invention have numerous industrial applications such as an anti-ripening agent in the agricultural industry. The silver particles of the preferred embodiment exhibit excellent algaecide and bacteriostatic properties with sustained release activity. It has been found that if silver-coated nano/micro particles are placed in an environment where fruits are ripening, the silver effectively enables the conversion of ethylene to ethylene oxide by a unique mechanism. Thus in a controlled environment, as ethylene is converted to ethylene oxide, biological species such as fungi, bacteria and spores are effectively destroyed. The process of ripening is retarded and the process of spoilage is dampened and thus nearly stopped. Unlike other approaches, this invention is unique in using a well-understood mechanism that uses orders of magnitude less silver, showing similar or higher efficiency, dramatically lower cost, and the combination of silver with enhanced surface area and an eco-friendly core material in nano/micro particle form.

BEST MODE FOR CARRYING OUT THE INVENTION

Figure 1:
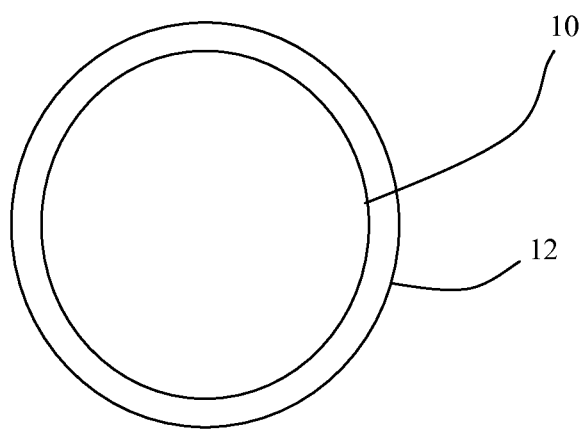
FIG. 1 is a cut-away elevational view of a particle according to a preferred embodiment of the present invention.

With reference to FIG. 1, a preferred embodiment of the present invention may now be described. The preferred embodiment is composed of a non-metallic nano/micro particle 10 coated with a layer of elemental silver 12. Since silver is an expensive metal, the production of solid silver nano/micro particles would limit their applications. The high density (10.49 g/cc) of silver affords very low surface area for one gram of silver even if the particle size is only about 50 nanometers ($10^{-9}$ meters). The surface area per gram may be calculated as $SA=6/\rho D$, where SA is surface area in $cm^2/g$, $\rho$ is density in g/cc, and D is diameter in cm=6/10.49×0.000050=11.439 $m^2/g$. Thus, a large amount of silver is wasted in a solid silver particle and is not available for the desired disinfection reaction. Also, the disinfection surface plays a critical role, and thus it is important to generating a coating where only desired amount of silver is used. The surface texture of the core particle may allow an increase in the surface area of silver, giving it the ability to increase the effectiveness of the particles.

Several inorganic or organic polymeric particles have a large surface area either from the surface or from the pores present on their surface. Typically, the values range from 100-400 $m^2/g$. These materials are an order of magnitude cheaper than silver particles. Thus by coating these low-cost particles with nanometer-thin silver by chemical or physical techniques, one may produce the effect of nano/micro particles of silver at a fraction of the cost of silver nano/micro particles. Not only is the cost reduced, but the effectiveness of the particles would be much higher due to a major increase in the relative surface area to volume ratio. Finally, it is only the silver on the surface that actively participates in the applications and is sacrificed in the reactive ripening medium in contact at a level of 20 parts per billion and produces the antibacterial or antiviral activity. Hence, the present invention teaches an alternative technical approach that replaces solid silver nano/micro particles with nano/micro particles of non-metallic material coated with elemental silver. This invention teaches not only an increase in the scope of the applications, but simultaneously teaches an enhancement in efficiency. Also, this invention describes a process to coat such non-metallic nano/micro particles with elemental silver material and optionally in other embodiments with other transition/noble metals. Further, selection of suitable non-metallic materials, such as sand or $SiO_2$ core particles, will not only provide the ability to be environmentally sustainable, but also could provide functional sensitivity, such as photo-sensitivity, for example when nano and micro $TiO_2$ or zinc oxide or silicon particles are selected. This may further enhance reactivity of over-coated silver or silver-like metal(s), due to combined photo-catalytic activities when applied in the supply chain for retail fruits.

For the purpose of metallic coating, elemental silver has been selected as a coating material for the inorganic nano/micro particle in the preferred embodiment described herein. The silver-coated nano/micro particles comprise silver 1 to 2% by weight of the particle. The silver-coated nano/micro particles of the present invention have high silver surface area per gram of silver employed to increase the effectiveness of the silver-coated particles. Thus, the coated nano/micro particles of inorganic material have only a fraction of the cost of silver nano/micro particles, dramatically lowering the price of the coated particles to about 1-5% of the cost of silver or $\frac{1}{20}^{th}$ of the cost of silver nano/micro particles. The silver coated nano/micro particles are equivalent to hollow nano/micro particles of silver, where all or part of the silver will be used up in the life cycle of the product.

The preferred embodiment is also directed to a simple and economical process for preparation of silver-coated nano/micro particles. The coated nano/micro particles comprise a non-metallic nano/micro particle core and a layer of elemental silver and/or their combinations with other elements disposed over the core. The non-metallic core is selected from inorganic material such as silica, calcium carbonate, barium sulfate, titanium dioxide, emulsion grade polyvinyl chloride, or porous polymeric particles and related other materials in various sizes and shapes.

Figure 2:
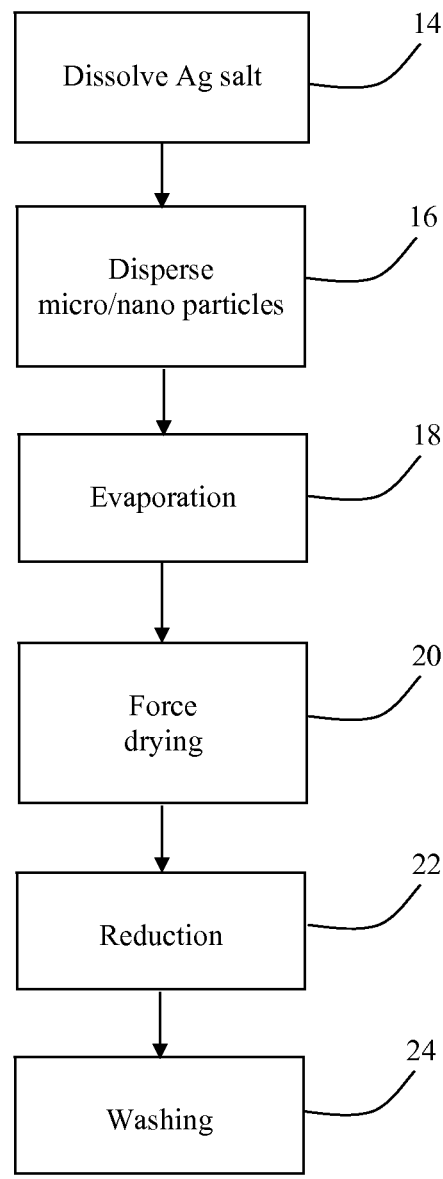
FIG. 2 is a flow diagram of a process for manufacturing a coated particle according to a preferred embodiment of the present invention.

Referring now to FIG. 2, a process for the preparation of silver-coated nano/micro particles according to a preferred embodiment of the present invention may be described. A known quantity of silver salt is dissolved at step 14 into a quantity of chloride-free demineralized water sufficient to soak non-metallic nano- or micron-size polymeric or inorganic particles. The particles are dispersed in the solution at step 16. The solution is evaporated at step 18 to produce a thick slurry. In this process, the silver ions are deposited on the surface of the nano/microparticles. The slurry is further force dried at step 20 to deposit the residual silver on the particles, preferably using an oven at 50-120° C. for 2 hours. At step 22 a reducing agent is selected from a range of organic or inorganic reducing agents dissolved in water, and is added in commensurate quantity in dilute form to completely cover the surface of the dried particles, then allowed to stand for 2-4 hours and optionally heated to 100-120° C. in a closed environment until reduction is complete. Then these reduced particles are slurried in demineralized water, filtered and washed at step 24 until free of any residual reducing agent and finally dried. The white particles exhibit a light-yellow tinge, which is characteristic of fine silver particles.

The silver salt is selected from nitrate, acetate, or ammonical silver chloride or silver sulfate, which are soluble in water. The reducing agents of choice are solutions of hydrazine, solution of sodium meta-bisulfite or solid meta-bisulfite or sodium sulfite or sodium borohydride, sodium hypophosphate, elemental hydrogen, carbon monoxide or formaldehyde or acetaldehyde or glucose, or other reducing sugars from aldehydes and ketone varieties and their combinations thereof.

In another preferred embodiment the invention provides a process for the incorporation of coated nano/micro particles in such substrates, for example plastics, by mixing the plastic granules with coated nano/micro particles and processing by usual method in films by extrusion, blowing, calendaring or injection molded into products. Plastic granules are selected from various types such as polyethylene, polypropylene, linear low density polyethylene, poly vinyl chloride, polystyrene, and any other commodity plastic. This combination of nano/micro particles with substrate could further be extended to hosts such as various types of papers and their hybrids, fibers such as jute, and any other packaging materials. These materials could also be fabricated in various forms, commensurate with the needs of the fruit and other supply chains. Not only could films be used but also bags, containers, wraps, foamed plastic wraps, sprays, and other shapes, like the fruit itself, that are a part of the fruit shipment. In addition to use with fruits, such a combined technical solution could also be applied to other types of perishable items, such as flowers, to help retain freshness and extend useable life and reduce the degrading effect of the environment.

In another embodiment, these particles can be derived as sensors and actuators, to sense level of gases, microbes and other agents as well as can convert and store energy, respectively, to provide higher level of environmental sustainability to this invention. Another important feature of this embodiment is also in noninvasive use of the above described silver and other elements coated particles and their ability to function in combination with state of the art devices such as RFID tags used in fruits and other supply chains to track the products.

In an additional embodiment, the coating on the particles could be passive, when for example, converting ethylene to ethylene oxide but also could be active, for example, when scarifying through dissolution in time or functional release modes. The later could be effective when applied to meat or medicinal or vegetable applications to decontaminate bacteria.

The following examples, which include preferred embodiments, will serve to illustrate the practice of this invention, it being understood that the particulars shown are by way of example and for purpose of illustrative discussion of preferred embodiments of the invention.

Example 1

Step 1: Silver nitrate loading: 100 grams (0.591 gram moles) of silver nitrate is dissolved in demineralized water (1-2 liters) and the silver nitrate solution is subsequently diluted by the addition of 10-12 liters of demineralized water. Nonsurface treated precipitated calcium carbonate (10 kg) is added to the solution with constant stirring to ensure uniform mixing. The mixture is dried in an oven at a temperature below 120° C.

Step 2: Reduction of silver nitrate coated nano/micro particles using hydrazine hydrate: 50 g of 85% Hydrazine hydrate (1.325 gram mole) is dissolved in demineralized water (1 liter). This was added to the dried silver nitrate loaded calcium carbonate with constant stirring in a sigma mixer and allowed to react for four hours. The mixture was dried at 100-125° C. in an oven to obtain coated silver nano/micro particles with a calcium carbonate core. The particles were slurried in demineralized water, filtered and washed till free of any residual reducing agent and nitrates and finally dried.

Example 2

Step 1: Silver nitrate loading: 158.8 grams (0.934 gram moles) of silver nitrate is dissolved in demineralized water (1-2 liters) and subsequently diluted by the addition of 100-120 liters of demineralized water. Fumed silica (10 kg) is added to the solution with constant stirring to ensure uniform mixing.

Step 2: Reduction of silver nitrate nano particles using hydrazine hydrate: 50 g of 85% Hydrazine hydrate (1.325 gram mole) is dissolved in demineralized water (1 liter). Hydrazine hydrate solution is added with constant stirring to the dispersion of example 1 and kept for four hours. The mixture is dried at 50-65° C. in an oven to obtain coated silver nano/micro particles with fumed silica core. The particles are slurried in demineralized water, filtered and washed till free of any residual reducing agent and are used either as wet or as a flush in the required medium. The nano silica particles tend to flocculate if completely dried.

Example 3

15 g Palladium chloride is dissolved in 150 cc 2 N hydrochloric acid and diluted to 100 liters with demineralized water. 10 kg of fumed silica is thoroughly mixed with this solution to allow a very fine layer of palladium chloride to be deposited on the surface of the particles. These are reduced by the addition of 100 g of hydrazine hydrate diluted to 1 liter. The reduced particles appear slightly black in color.

Prophetic Example 1

For deposition of elements such as nickel, a surface which is electrically conducting would be better. For this a very thin layer of silver or copper could be deposited on the surface and the deposition of nickel could be followed by reduction of nickel salts with reducing agents such as sodium hypo phosphite.

The silver coated particles of the present invention have numerous industrial applications especially in the areas of agricultural and food industries. Industrial applications also exist in healthcare, including biomedical instrumentation such as coatings on medical tools. The silver nano/micro particles of the present invention exhibit excellent algaecide and bacteriostatic properties with sustained release and reactivity.

The poor life of fruits that ripen while in the food supply chain is a cause of environmental concern due to the amount of loss. Since the life after harvesting is limited to 3-4 days, the farmer is forced to pluck the fruits when they are only 80% ripe. The time taken for these fruits to completely ripen varies from 3-10 days, allowing for distribution to consumers. This trend is growing in global supply chains where delays and changing environmental conditions further increase the loss of perishable items due to ripening and other related processes. The process of ripening produces ethylene. Ethylene is also a catalyst for the process of ripening. Thus, if the ethylene is not removed from the surroundings of the fruit, the process of ripening is accelerated and becomes out of control. During the time the fruits move through the supply chain this process of uncontrolled ripening could be accelerated in conditions of uncontrolled temperature and/or humidity. This leads to a loss of fruits. Also, the uncontrolled ripening is accompanied by the growth of fungi, bacteria and spores on these perishable items making the situation cumulatively more difficult.

Silver-coated nano/micro particles placed in the environment where fruits ripen can effectively destroy the generated ethylene and convert it to ethylene oxide. Silver is the only known catalyst for oxidation of ethylene to ethylene oxide. Ethylene oxide is a very well known disinfectant used even in medical surgery rooms. Thus, in a controlled environment, as produced by the invention as described herein, ethylene gets converted to ethylene oxide, which effectively destroys unwanted biological species such as fungi, bacteria and spores. The process of ripening is significantly retarded and the process of spoilage is retarded and stopped for practical purposes. Polyethylene bags of 100 micron thickness containing 1% by weight of calcium carbonate particles coated with 1% silver could effectively extend the life of highly perishable fruits such as banana and melons by as much as 120-192 hours (5-8 days), when the fruits were stored in such bags at room temperature with air sealing. This time for extended preservation could be further increased if the fruits are kept cold during shipping. Experiments show that such bags may be used repeatedly without significant change in the performance property for more than one year. The use of these bags would allow the producer to ripen a fresh fruit crop naturally on the vine, enhance its taste, and enable shippers and retailers to retard spoilage and increase the shelf life of their produce. The produce distributor packaging industry is a billion-dollar market annually and is projected to grow globally. This growth will be fueled by rising consumer demand for fresh produce with enhanced freshness and better taste. Even end use of trash bags could benefit from this invention in that incorporation of the silver-coated nano/micro particles with added perfume in the material of the bags would result in a better smelling bag with more antibacterial capabilities. Additionally, this invention will address key issues related to environmental sustainability in the following ways: (1) reduce wastage due to premature ripening, before reaching to consumer, (2) save wastage and thus, open up the possibility to provide saved product to a larger population, (3) produce less crop, as the need for compensation for premature ripening losses are not as dire, and thus, proportionally less fertilizer will go in the soil, and (4) the fractional amount of silver along with calcium carbonate or $SiO_2$ (sand) as a core non-metallic in polymer matrix, such as poly lactic acid will make this product bio degradable, unlike any of the current products in the industry. Thus, this invention addresses sustainability, which is a global concern of this century.

Similar results to extend the ripening period could be obtained with dusting powder which could be used only once. Experiments have shown that the palladium-coated particles also retarded the ripening of fruits but were not able to prevent spoilage of fruits due to fungus. In the case of silver-coated non-metallic particles, the effectiveness is not only due to the reduction of ethylene, similar to the palladium, which oxidizes ethylene to acetaldehyde or carbon dioxide rather than to ethylene oxide, but the conversion of ethylene to ethylene oxide serves to disinfect by its reduction in the fungus population, unlike the case of palladium.

Further, such particles may be implemented in the supply chain in various physical forms, such as bags, containers, wraps, blocks, spray and other related items and their combinations. For example, spray coating or electrostatic spray coating (ESC) could give the same results when applied on a pallet for fruit or paper-based fruit rack separators, such as for a stack of apples. A convenient method of delivering the spray coating could be by canister. Additionally, the paper bedding for the produce could be spray coated with material or could have the material embedded within the paper bedding during the paper manufacturing itself.

In another important application, such as in the packaging and shipping industry, heterogeneous packaging is a growing trend, where fruits are shipped with other items such as vegetables. In another important application, the combination of fruits with other perishable products may extend life of other perishable items too, as ethylene oxide will decontaminate those non-ethylene producing products as well.

Competing technologies include a packaging method that primarily focuses on produce respiration for fresh-cut produce, reduction of spoilage during storage and transportation using ethylene scrubbers designed to remove ethylene gas from the air, modified atmosphere packaging designed to increase carbon dioxide and reduce oxygen in the atmosphere surrounding the produce, moisture and humidity controls as well as temperature controls. These technologies are not completely effective in eliminating spoilage and a newer and better technology is needed in the industry.

Other diverse nonagricultural uses of silver and other metal coated nano/micro particles include the use of this invention in trash bags and trash truck or bio disposable containers. Additionally, other uses include antimicrobial agents, perfume or disinfectant release media, coatings of surgical instruments, equipments, sanitary napkins, diapers, additive to talcum powders, soaps, detergents for home use, as pigments for coatings on textiles to prevent odors, for prevention of bad breath in tooth paste, disinfectant coatings on walls, additive to interior and exterior architectural finishes and paints for prevention of algae growth. Further, this invention could be used as a catalyst with metal-coated nano/micro particles, embedding metal-coated nano/micro particles in membranes to prepare a membrane reactor that may be polymeric or ceramic, an addition to paints to enhance electrical conductivity for better electrostatic spraying, and an addition to plastics for improved electrostatic spraying. For instance, the silver nano/micro particles of a preferred embodiment of the present invention may be used as bactericide pigments by mixing in 1 to 2% along with other biocides and pigments in paints during dispersion or can be used in the textile industry by mixing along with pigments for printing purposes or along with finishing agents.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein. It should be appreciated that certain improvements and modifications may be practiced within the scope of the appended claims.

The invention claimed is:

1. A method for preparing a coated nano/micro particle, comprising the method steps of:
    (a) dissolving a transition metal-salt in a liquid solvent, thereby producing a solution;
    (b) dispersing a quantity of non-metallic inorganic cores in the solution;
    (c) evaporating the solvent from the solution to produce a slurry comprising a plurality of coated nano/micro particles each comprising a transition metal salt coating;
    (d) after evaporating the solvent, adding a reducing agent to the slurry in a quantity sufficient to reduce the transition metal-salt coating on the coated nano/micro particles to produce a slurry-reducing agent mixture; and
    (e) resting the slurry-reducing agent mixture for a plurality of hours at a temperature in the range of 100-120° C. until reduction is complete to produce metal-coated nano/micro particles.

2. The method of claim 1, wherein said transition metal-salt comprises a metal selected from the group consisting of copper, nickel, silver, palladium, platinum, ruthenium, gold, osmium, and rhodium.

3. The method of claim 1, wherein said nonmetallic inorganic cores comprise a material selected from the group consisting of silica, calcium carbonate, barium sulfate, and titanium dioxide.

4. The method of claim 3, wherein the nonmetallic inorganic cores consist of silica.

5. The method of claim 4, wherein the transition metal salt consists of silver nitrate.

6. The method of claim 1, wherein the metal-coated nano/micro particles comprise a metal coating that comprises 1-2% by weight of the metal-coated nano/micro particles.

7. The method of claim 1, further comprising the step of force drying the slurry prior to the step of adding a reducing agent to the slurry.

8. The method of claim 7, wherein the step of force drying is performed in an oven at a temperature in the range of 50-120° C.

9. The method of claim 8, wherein the step of force drying is performed for a duration of 2 hours.

10. The method of claim 1, wherein the resting step comprises resting the slurry-reducing agent mixture for 2-4 hours.

11. The method of claim 1, further comprising the step of, after the resting step, slurrying the metal-coated nano/micro particles in demineralized water to wash excess reducing agent from the metal-coated nano/micro particles.

12. The method of claim 11, further comprising a final drying of the metal-coated nano/micro particles after the step of slurrying the metal-coated nano/micro particles.

13. The method of claim 1, wherein the step of dissolving a transition metal-salt in a liquid solvent comprises the step of dissolving the transition metal-salt in chloride-free demineralized water.

14. The method of claim 1, wherein the reducing agent is selected from the group consisting of hydrazine, sodium meta-bisulfite, sodium sulfite, sodium borohydride, sodium hypophosphate, elemental hydrogen, carbon monoxide, formaldehyde, acetaldehyde, and glucose.

15. The method of claim 14, wherein the reducing agent consists of hydrazine hydrate.

16. The method of claim 14, wherein the reducing agent consists of sodium hypophosphate.

* * * * *